United States Patent
Wilkinson et al.

(10) Patent No.: US 11,274,597 B2
(45) Date of Patent: Mar. 15, 2022

(54) TWO STAGE TURBOCHARGER WITH COOLING ARRANGEMENT

(71) Applicant: Perkins Engines Company Limited, Peterborough (GB)

(72) Inventors: David Wilkinson, Fletton (GB); Prabhu Ramasamy, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/892,606

(22) Filed: Jun. 4, 2020

(65) Prior Publication Data

US 2020/0392893 A1    Dec. 17, 2020

(30) Foreign Application Priority Data

Jun. 11, 2019  (GB) ..................... 1908325

(51) Int. Cl.
   *F02B 37/013*  (2006.01)
   *F02B 37/18*   (2006.01)
   *F02M 31/20*   (2006.01)

(52) U.S. Cl.
   CPC ............ *F02B 37/013* (2013.01); *F02B 37/18* (2013.01); *F02M 31/205* (2013.01)

(58) Field of Classification Search
   CPC .... F02B 37/013; F02B 37/18; F02B 29/0475; F02B 37/183; F02B 39/005; F02B 37/16; F02B 37/164; F02B 37/004; F02B 37/186; F02M 31/205; Y02T 10/12; F01D 13/02; F01D 25/12; F01D 5/082; F05D 2260/211; F05D 2260/213; F05D 2220/40; F04D 29/5826; F04D 17/12
   See application file for complete search history.

(56) References Cited

U.S. PATENT DOCUMENTS

| | | |
|---|---|---|
| 3,829,235 A | 8/1974 | Woollenweber, Jr. |
| 4,918,923 A | 4/1990 | Woollenweber, Jr. et al. |
| 6,658,848 B1 | 12/2003 | Pierpont |
| 8,784,036 B2 | 7/2014 | Woollenweber, Jr. |
| 9,458,760 B2 | 10/2016 | Morelli et al. |
| 2014/0060039 A1* | 3/2014 | Powers ............... F02B 29/0475 60/599 |
| 2016/0003136 A1 | 1/2016 | Maenpaa |
| 2018/0216633 A1 | 8/2018 | Makino et al. |

OTHER PUBLICATIONS

United Kingdom Search Report related to Application No. 1908325.2; dated Nov. 20, 2019.

* cited by examiner

*Primary Examiner* — Audrey B. Walter
*Assistant Examiner* — Edward Bushard

(57) ABSTRACT

The high pressure compressor wheel of a two stage turbocharger assembly is cooled by charge air bled from the charge air flowpath downstream of the aftercooler. A wastegate may be arranged across the high pressure stage and operated by an actuator which in turn is operable by the static or dynamic pressure of the charge air in the cooling flowpath. The cooling airflow may be blocked to open the wastegate and released or resumed to close the wastegate so that cooling air is supplied only while the high pressure compressor wheel is under load.

8 Claims, 2 Drawing Sheets

PRIOR ART

TWO STAGE TURBOCHARGER WITH COOLING ARRANGEMENT

CROSS-REFERENCE TO RELATED APPLICATION

This application claims priority under 35 USC § 119 and the Paris Convention to Great Britain Application No. 1908325.2 filed on Jun. 11, 2019.

TECHNICAL FIELD

This invention relates to cooling arrangements in two stage turbochargers.

BACKGROUND

A turbocharger supplying air to an internal combustion engine will run at elevated temperature due to the heat of the exhaust gas impinging on the turbine and the heat generated by compression of the charge air flowing through the compressor wheel. An aftercooler may be arranged to cool the compressed charge air downstream of the compressor wheel before it enters the inlet manifold of the engine.

It is known to cool the compressor wheel of a single stage turbocharger by diverting part of the charge air from a point downstream of the aftercooler to impinge on the back of the compressor wheel.

U.S. Pat. No. 8,784,036 B2 teaches to supply cooling air to a cooling jacket arranged around the bearings of a turbocharger compressor wheel, either via internal bleed holes or from a point downstream of a charge air aftercooler. Where the cooling air is supplied via internal bleed holes, valves can be arranged to control the cooling air flow rate to limit the speed of the rotor, obviating the need for a wastegate and its associated control system.

Two-stage turbochargers employ a second (high pressure) compressor wheel downstream of a first (low pressure) compressor wheel to achieve a higher overall compression ratio. Typically the exhaust gas and charge air flow in opposite directions through the two stages so that both the turbine and compressor wheels of one set operate at relatively high pressure, and those of the other set operate at relatively low pressure.

The downstream (high pressure) compressor wheel is commonly made from a high temperature metal such as titanium to withstand its normal operating temperature which is typically higher than that of the upstream (low pressure) compressor wheel.

FIG. 1 shows a two-stage turbocharger system according to the prior art in which a wastegate is arranged to selectively bypass the upstream (high pressure) turbine wheel to reduce the speed of the upstream (high pressure) turbine wheel and downstream (high pressure) compressor wheel.

The wastegate is operated by an actuator including a diaphragm spring biased to the wastegate-closed position and movable to the wastegate-open position by the static pressure of charge air in a supply line from the inlet manifold of the engine, downstream of the aftercooler. A flow restriction is arranged in the supply line upstream of the actuator, and an actuator control system operates a valve downstream of the actuator to selectively depressurise the supply line to atmosphere. When the valve is opened, the flow restriction increases the velocity of the charge air flowing to atmosphere through the flow restriction. The high velocity flow generates suction to depressurise the actuator, causing the bias spring of the actuator to close the wastegate. This arrangement reduces the response time of the actuator when closing the wastegate.

SUMMARY

The present disclosure provides a two stage turbocharger assembly for supplying charge air to an internal combustion engine, including first and second stage turbochargers and an aftercooler.

The first stage turbocharger has a first compressor wheel driven in rotation by a first turbine wheel, and the second stage turbocharger has a second compressor wheel driven in rotation by a second turbine wheel. The first and second turbine wheels are arranged in series in an exhaust flowpath to be driven in rotation by exhaust gas flowing through the exhaust flowpath, while the second compressor wheel is arranged downstream of the first compressor wheel in a charge air flowpath to compress charge air flowing through the charge air flowpath.

The aftercooler is arranged to cool the charge air flowing through the charge air flowpath downstream of the second compressor wheel.

A cooling flowpath is arranged to direct a flow of charge air from the charge air flowpath downstream of the aftercooler to the second compressor wheel to cool the second compressor wheel.

The second compressor wheel may be made from aluminium or aluminium alloy.

The assembly may include a wastegate which is openable to allow exhaust gas flowing through the exhaust flowpath to bypass the second turbine wheel, together with an actuator control system, and an actuator operable responsive to the actuator control system to open and close the wastegate.

The actuator may be operable by charge air from the cooling flowpath.

The actuator control system may be operable to block the flow of charge air from the cooling flowpath to the second compressor wheel to operate the actuator to open the wastegate, and to release the flow of charge air from the cooling flowpath to the second compressor wheel to operate the actuator to close the wastegate.

The cooling flowpath may be arranged to define a flow restriction upstream of the actuator, and the actuator control system may include a valve arranged to block and release the flow of charge air from the cooling flowpath downstream of the actuator. The actuator may then be operated by air pressure in the cooling flowpath between the flow restriction and the valve.

The flow restriction may be configured to generate suction to depressurise the actuator to close the wastegate by increasing velocity of the charge air flowing through the flow restriction.

In a related method, a flow of charge air is directed from the charge air flowpath downstream of the aftercooler, via the cooling flowpath, to the second compressor wheel to cool the second compressor wheel.

BRIEF DESCRIPTION OF THE DRAWINGS

Further features and advantages will be appreciated from the following illustrative embodiment which will now be described, purely by way of example and without limitation to the scope of the claims, and with reference to the accompanying drawings, in which:

Reference numerals and characters appearing in more than one of the figures indicate the same or corresponding parts in each of them.

DETAILED DESCRIPTION

Figure 1:
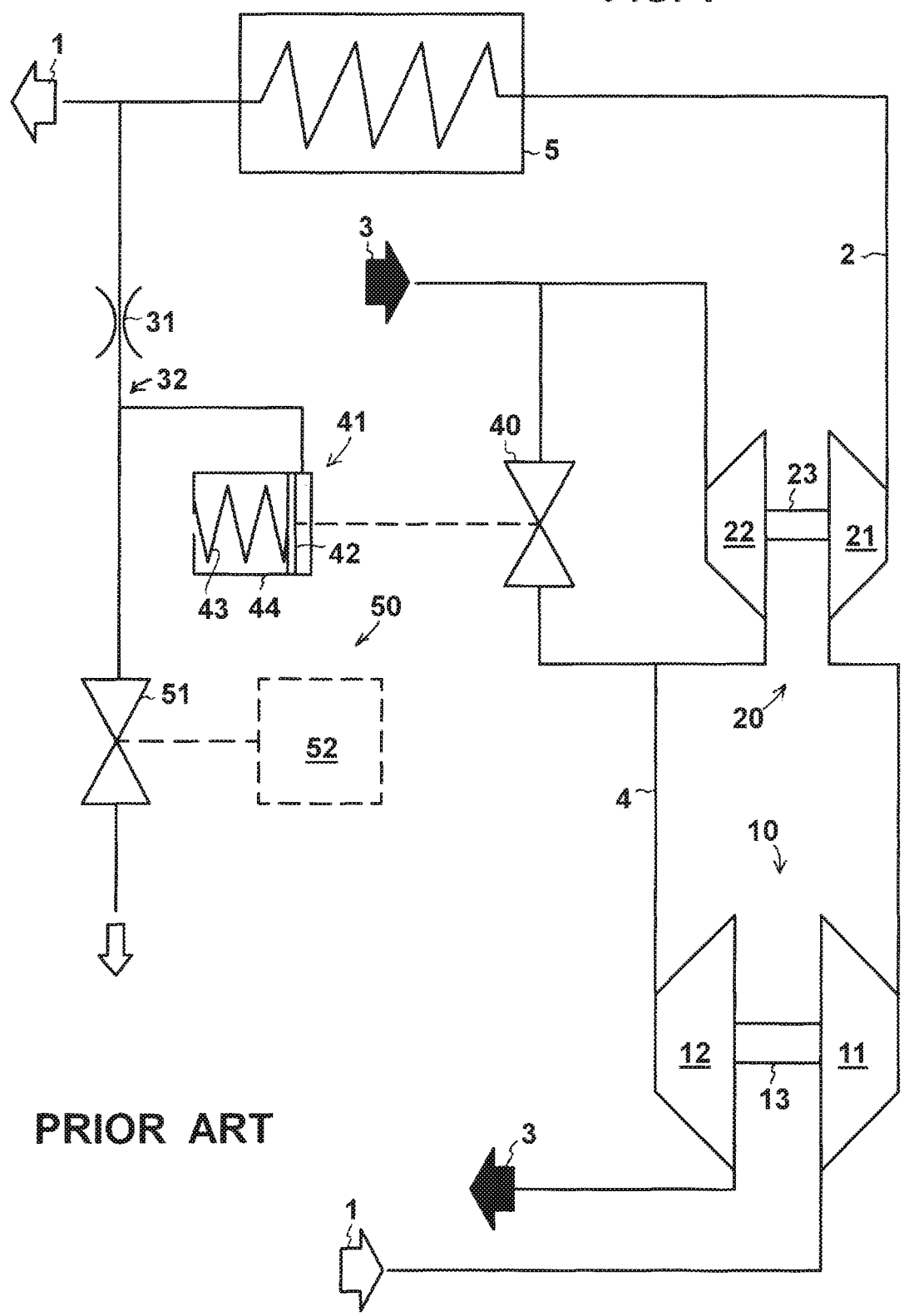
FIG. 1 shows a prior art two-stage turbocharger system.
Figure 2:
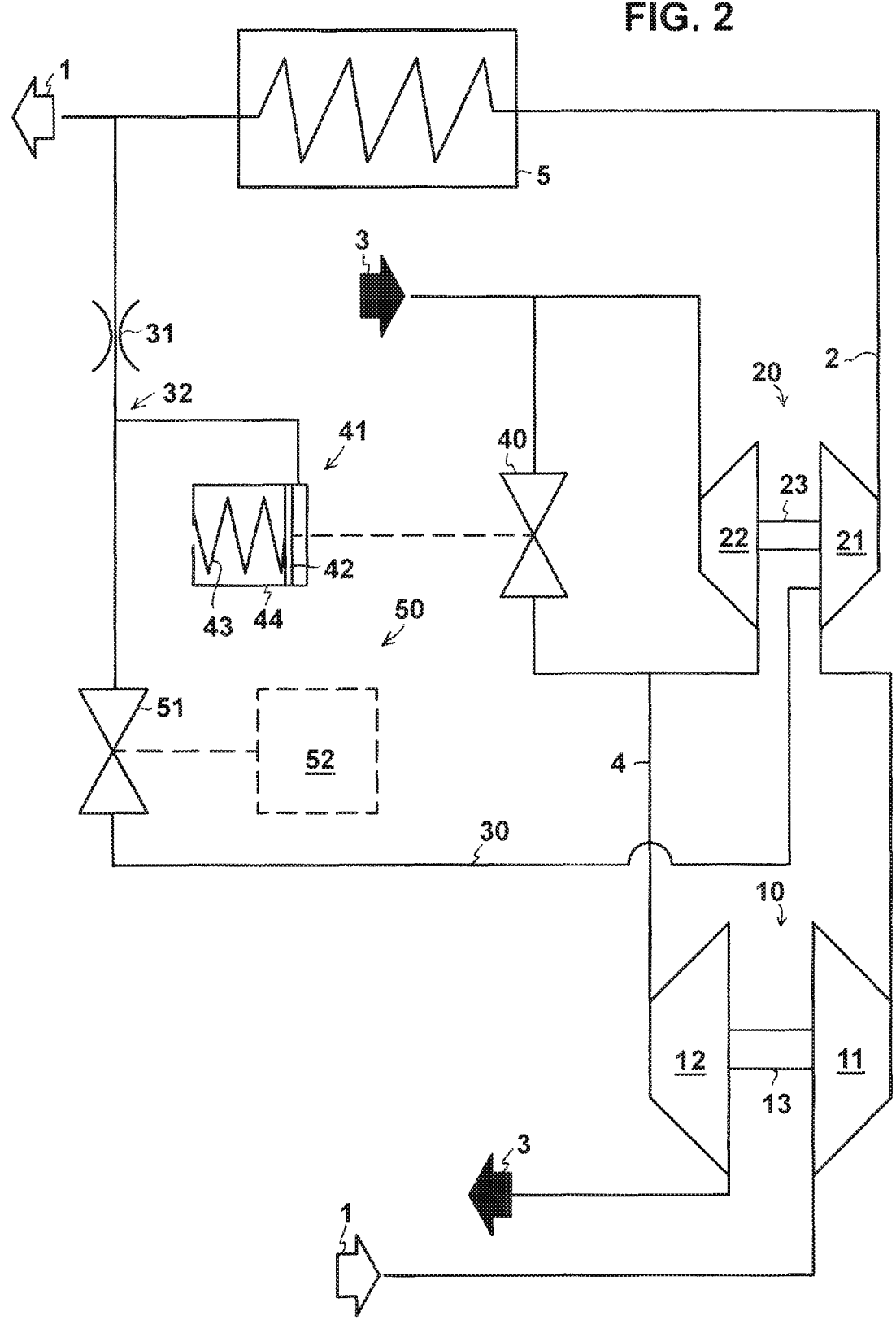
FIG. 2 shows a two-stage turbocharger system in accordance with an embodiment of the disclosure.

Referring to FIG. 2, a two stage turbocharger assembly is configured to supply charge air 1 (which is to say, air for combustion inside the engine) via a charge air flowpath 2 to an internal combustion engine (not shown). The charge air is mixed with fuel and the mixture is combusted in the engine to produce an exhaust gas 3 which flows through an exhaust flowpath 4, typically via an exhaust treatment system to atmosphere. The charge air may be drawn from atmosphere via an upstream air cleaner in the conventional way.

The assembly includes a first stage (relatively low pressure) turbocharger 10, and a second stage (relatively high pressure) turbocharger 20. The first stage turbocharger 10 has a first compressor wheel 11 driven in rotation by a first turbine wheel 12, while the second stage turbocharger 20 has a second compressor wheel 21 driven in rotation by a second turbine wheel 22. Both wheels of each set may be mounted on a respective, common shaft 13, 23 in the conventional way.

The first and second turbine wheels 12, 22 are arranged in series in the exhaust flowpath 4 to be driven in rotation by the exhaust gas 3 flowing through the exhaust flowpath 4. The second turbine wheel 22 may be arranged upstream of the first turbine wheel 12 in the exhaust flowpath 4 so that the exhaust gas 3 expands through the second (high pressure) turbine wheel 22 before further expanding through the first (downstream, relatively low pressure) turbine wheel 12, as known in the art.

The second compressor wheel 21 is arranged downstream of the first compressor wheel 11 in the charge air flowpath 2 to compress the charge air 2 flowing through the charge air flowpath 2. The charge air is first compressed by the first (relatively low pressure) compressor wheel 11 before flowing to the second (downstream, relatively high pressure) compressor wheel 21 which further compresses it.

The assembly further includes an aftercooler 5, which is to say, a heat exchanger configured to cool the charge air 1 flowing through the charge air flowpath 2 downstream of the second compressor wheel 21. The compressed and cooled charge air 1 flows from the aftercooler 5 to the engine, typically via an inlet manifold (not shown).

The assembly further includes a cooling flowpath 30 which is arranged to direct a cooling airflow of compressed and cooled charge air 1 from the charge air flowpath 2 downstream of the aftercooler 5 and upstream of the engine, to the second compressor wheel 21 to cool the second compressor wheel.

Where the second compressor wheel 21 is configured so that the charge air flows into and out of the wheel on a first (active) face of the wheel, the cooling airflow may be discharged inside the fixed casing of the second compressor wheel 21 so that it contacts or impinges on the opposite, rear (inactive) face of the second compressor wheel 21.

The cooling airflow may combine with the charge air leaving the second compressor wheel 21, for example, after flowing around the second compressor wheel 21 from its rear face to its front face, so that the cooling airflow rejoins the charge air 1 flowing to the engine without loss to atmosphere.

The second compressor wheel 21 may be made from a relatively low temperature metal such as aluminium or aluminium alloy, optionally the same material as the first compressor wheel 11.

The assembly may further include a wastegate 40 which is openable and closeable. The wastegate 40 may be configured as a valve, and when open allows exhaust gas 3 flowing through the exhaust flowpath 4 to bypass the second turbine wheel 22. The wastegate is opened and closed by an actuator 41 which is operable responsive to an actuator control system 50.

The actuator 41 may be operable by charge air 1 from the cooling flowpath 30.

This may be achieved by configuring the actuator 41 as known in the art as a diaphragm or piston 42 mounted in a canister 44 and biased by a resilient bias means, for example, a return spring 43 to the wastegate-closed position, with the static pressure of the charge air 1 from the cooling flowpath 30 being applied to the diaphragm or piston 42 to move the diaphragm or piston 42 against the restoring force of the bias means to the wastegate-open position. The bias means could be any means for applying a restoring force, for example, an air spring, or another resilient arrangement operating by gas pressure against one side of a diaphragm.

The actuator control system 50 may be operable to block the flow of charge air 1 from the cooling flowpath 30 to the second compressor wheel 21 to operate the actuator 41 to open the wastegate 40, and to release the flow of charge air 1 from the cooling flowpath 30 to the second compressor wheel 21 to operate the actuator 41 to close the wastegate 40. Blocking the flow may comprise interrupting or stopping the flow, or reducing the flow. Releasing the flow allows the flow to resume or increase to a maximum.

This may be achieved by arranging the cooling flowpath 30 to define a flow restriction 31 upstream of the actuator 41, and by including in the actuator control system 50 a valve 51 which is arranged to selectively block and release the flow of charge air 1 from the cooling flowpath 30 downstream of the actuator 41. The actuator 41 may then be operated by air pressure in the cooling flowpath 30 between the flow restriction 31 and the valve 51.

In order to reduce the response time of the actuator 41 when closing the wastegate 40, the flow restriction 31 may be configured as known in the art to generate suction to depressurise the actuator 41 to close the wastegate 40 by increasing the velocity of the charge air 1 flowing through the flow restriction 31.

For example, the flow restriction may be configured as a nozzle or orifice which directs a high velocity flow through an enlarged portion 32 of the flowpath downstream of the flow restriction. The flow restriction and the enlarged portion downstream of the flow restriction may be configured as an eductor to suck the charge air out of the canister 44. A Venturi may be arranged downstream of the flow restriction to form part of the eductor as known in the art.

The actuator control system 50 may include a controller 52, for example, an engine control unit or ECU or other electronic controller with a processor and memory, to control the operation of the valve 51 responsive to sensor input in accordance with an operating program.

In summary, the high pressure compressor wheel 21 of a two stage turbocharger assembly is cooled by charge air 1 bled from the charge air flowpath 2 downstream of the aftercooler 5. A wastegate 40 may be arranged across the high pressure stage and operated by an actuator 41 which in turn is operable by the static or dynamic pressure of the charge air 1 in the cooling flowpath 30. The cooling airflow may be blocked to open the wastegate 40 and released or resumed to close the wastegate 40 so that cooling air is supplied only while the high pressure compressor wheel 21 is under load.

In accordance with the novel method, a flow of charge air 1 is directed from the charge air flowpath 2 downstream of the aftercooler 5, via the cooling flowpath 30, to the second compressor wheel 21 to cool the second compressor wheel.

In alternative embodiments, the flow of charge air 1 from the cooling flowpath 30 to the second compressor wheel 21 may be selectively blocked and released by arranging a valve in another position on the cooling flowpath 30. For example, a valve could be arranged upstream of the actuator, optionally without a flow restriction or with a flow restriction downstream of the actuator, with the actuator being operable by static or dynamic pressure of the charge air in the cooling flowpath (optionally also by the restoring force of a bias spring) to open the wastegate when the flow is blocked, and to close the wastegate when the flow is released, which is to say, restored.

In further alternative embodiments, the assembly including the cooling flowpath could be arranged without a wastegate and its associated actuator and control system, or the wastegate actuator could be arranged independently of the cooling flowpath, for example, to be operable by a solenoid or by a separate supply of compressed charge air, e.g. directly from the inlet manifold of the engine.

INDUSTRIAL APPLICABILITY

By providing a cooling airflow to the high pressure compressor wheel it is found that the high pressure compressor wheel may be made from a relatively lower cost material such as aluminium or aluminium alloy, instead of the titanium or other high temperature materials previously considered necessary for the second compression stage.

In embodiments having a wastegate configured as described above, when the wastegate is opened, the second (high pressure) turbocharger does less work and generates less heat. Under these conditions it is found that the second (high pressure) compressor wheel may remain within a safe operating temperature range even if made from aluminium or aluminium alloy, without a cooling airflow, and so the cooling airflow may safely be blocked to cause the wastegate actuator to open the wastegate, for example, by applying static pressure to the wastegate actuator.

When the wastegate is closed, the second (high pressure) turbocharger is powered and generates more heat. Thus, the compressed and cooled charge air can be used more efficiently by cooling the second (high pressure) compressor wheel only when the wastegate is closed, and in particular, by arranging for the released or restored flow of cooling air to the second (high pressure) compressor to operate the wastegate actuator to urge the wastegate to the closed position.

It is desirable for the wastegate to close as quickly as possible so as to improve the response time of the turbocharger system and hence the engine that depends on it. This can be achieved by releasing charge air via a flow restriction to generate a partial vacuum or negative pressure which rapidly exhausts pressure from the actuator, as known in the art. Under these conditions it is found that the flow of charge air via the flow restriction can provide adequate cooling to still maintain the second (high pressure) compressor wheel inside its operating temperature range, even when made from aluminium or aluminium alloy.

Thus, by operating the actuator by charge air 1 from the cooling flowpath, it is possible to arrange for the charge air which would have been exhausted to atmosphere in the prior art system to be returned to the engine, while cooling the high pressure compressor wheel to a sufficient extent to enable the use of lower temperature materials.

Further adaptations are possible within the scope of the claims.

In the claims, reference numerals and characters are provided in parentheses, purely for ease of reference, and should not be construed as limiting features.

What is claimed is:

1. A two stage turbocharger assembly for supplying charge air to an internal combustion engine, including:
   first and second stage turbochargers, and
   an aftercooler;
   the first stage turbocharger having a first compressor wheel driven in rotation by a first turbine wheel;
   the second stage turbocharger having a second compressor wheel driven in rotation by a second turbine wheel;
   the first and second turbine wheels being arranged in series in an exhaust flowpath to be driven in rotation by exhaust gas flowing through the exhaust flowpath;
   the second compressor wheel being arranged downstream of the first compressor wheel in a charge air flowpath to compress charge air flowing through the charge air flowpath;
   the aftercooler being arranged to cool the charge air flowing through the charge air flowpath downstream of the second compressor wheel;
   and further including a cooling flowpath, the cooling flowpath being arranged to direct a flow of charge air from the charge air flowpath downstream of the aftercooler to the second compressor wheel to cool the second compressor wheel;
   a wastegate openable to allow exhaust gas flowing through the exhaust flowpath to bypass the second turbine wheel,
   an actuator control system, and
   an actuator operable responsive to the actuator control system to open and close the wastegate, wherein the actuator is operated by air pressure in the cooling flowpath, and wherein the cooling flowpath rejoins the charge air flowpath without loss to atmosphere.

2. The two stage turbocharger assembly according to claim 1, wherein the second compressor wheel is made from aluminum or aluminum alloy.

3. The two stage turbocharger assembly according to claim 1, wherein the actuator control system is operable:
   to block the flow of charge air from the cooling flowpath to the second compressor wheel to operate the actuator to open the wastegate, and
   to release the flow of charge air from the cooling flowpath to the second compressor wheel to operate the actuator to close the wastegate.

4. The two stage turbocharger assembly according to claim 3, wherein:
   the cooling flowpath is arranged to define a flow restriction upstream of the actuator,
   the actuator control system includes a valve arranged to block and release the flow of charge air from the cooling flowpath downstream of the actuator, and
   the actuator is operable by air pressure in the cooling flowpath between the flow restriction and the valve.

5. The two stage turbocharger assembly according to claim 1, wherein the flow restriction is configured to generate suction to depressurise the actuator to close the wastegate by increasing velocity of the charge air flowing through the flow restriction.

6. A method of cooling a compressor wheel in a two stage turbocharger assembly for supplying charge air to an internal combustion engine, the assembly including:
first and second stage turbochargers, and
an aftercooler;
the first stage turbocharger having a first compressor wheel driven in rotation by a first turbine wheel;
the second stage turbocharger having a second compressor wheel driven in rotation by a second turbine wheel;
the first and second turbine wheels being arranged in series in an exhaust flowpath to be driven in rotation by exhaust gas flowing through the exhaust flowpath;
the second compressor wheel being arranged downstream of the first compressor wheel in a charge air flowpath to compress charge air flowing through the charge air flowpath;
the aftercooler being arranged to cool the charge air flowing through the charge air flowpath downstream of the second compressor wheel;
and further including a wastegate operable to allow exhaust gas flowing through the exhaust flowpath to bypass the second turbine wheel,
an actuator control system, and
an actuator operable response to the actuator control system to open and close the wastegate, wherein the actuator is operated by air pressure in the cooling flowpath, and wherein the cooling flowpath rejoins the charge air flowpath without loss to atmosphere;
the method including:
directing a flow of charge air from the charge air flowpath downstream of the aftercooler, via a cooling flowpath, to the second compressor wheel to cool the second compressor wheel.

7. The method according to claim 6, further including operating the actuator control system:
to block the flow of charge air from the cooling flowpath to the second compressor wheel to operate the actuator to open the wastegate, and
to release the flow of charge air from the cooling flowpath to the second compressor wheel to operate the actuator to close the wastegate.

8. The method according to claim 7, further including:
arranging the cooling flowpath to define a flow restriction upstream of the actuator,
providing the actuator control system with a valve, the, valve being arranged to block and release the flow of charge air from the cooling flowpath downstream of the actuator, and
operating the actuator by air pressure in the cooling flowpath between the flow restriction and the valve.

\* \* \* \* \*